United States Patent
Nakahara (10) Patent No.: US 8,637,787 B1
(45) Date of Patent: Jan. 28, 2014

(54) ELECTROCHEMICAL DEVICE COMPONENTS HAVING WELD REGIONS

(75) Inventor: Hiroshi Nakahara, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 1230 days.

(21) Appl. No.: 12/082,001

(22) Filed: Apr. 7, 2008

Related U.S. Application Data (60) Provisional application No. 60/921,996, filed on Apr. 5, 2007.

(51) Int. Cl.
*B23K 26/00* (2006.01)
*H01M 2/00* (2006.01)

(52) U.S. Cl.
USPC ..................... 219/121.64; 429/163

(58) Field of Classification Search
USPC .......................... 219/121.66, 121.78, 121.85, 219/121.63–121.65; 429/163
See application file for complete search history.

(56) References Cited

U.S. PATENT DOCUMENTS

| | | | | |
|---|---|---|---|---|
| 4,707,421 A | * | 11/1987 | McVeigh et al. | 429/94 |
| 5,503,948 A | * | 4/1996 | MacKay et al. | 429/152 |
| 5,879,416 A | * | 3/1999 | Nakamura et al. | 29/623.2 |
| 6,241,790 B1 | * | 6/2001 | Matsubara et al. | 29/623.1 |
| 7,575,829 B1 | * | 8/2009 | Nakahara et al. | 429/175 |
| 2003/0157404 A1 | * | 8/2003 | Inoue et al. | 429/175 |
| 2004/0079738 A1 | * | 4/2004 | Sakamoto et al. | 219/121.82 |
| 2004/0101746 A1 | * | 5/2004 | Ota et al. | 429/161 |
| 2004/0147961 A1 | * | 7/2004 | O'Phelan et al. | 607/1 |
| 2009/0223940 A1 | * | 9/2009 | Hosoya | 219/121.64 |

* cited by examiner

*Primary Examiner* — Sang Y Paik (74) *Attorney, Agent, or Firm* — Garrilouch, Dodd & Lindsay, LLP (57) ABSTRACT

Formation of an electrochemical device includes removing a layer of a metal oxide from battery components so as to define a weld region and an exposed region on the components. A surface of the weld region includes the metal oxide and a surface of the exposed region includes the metal oxide at a lower concentration than the weld region. The method also includes arranging the components such that a seam is defined between the components with weld regions positioned on opposing sides of the seams. The method further includes contacting at least one of the weld regions with a laser while laser welding the components together along the seam.

20 Claims, 6 Drawing Sheets

ELECTROCHEMICAL DEVICE COMPONENTS HAVING WELD REGIONS

REFERENCE TO RELATED APPLICATIONS

This application claims priority to U.S. Provisional Patent application Ser. No. 60/921,996, filed on Apr. 5, 2007, entitled "Electrochemical Device Components Having Weld Regions," and incorporated herein in its entirety.

FIELD

The present invention relates to electrochemical devices, and more particularly to electrochemical devices having welded parts.

BACKGROUND

It is often desirable to employ laser welding to weld together components of electrochemical power sources such as a batteries because it is a non-contact process and accordingly does not deform welded parts. However, laser welding of metal components often proves difficult because the metal components reflect a large portion of the laser light. As a result, there is a need for batteries having an improved weld.

SUMMARY

A method of forming a battery includes removing a layer of a metal oxide from battery components so as to define a weld region and an exposed region on the components. A surface of the weld region includes the metal oxide and a surface of the exposed region includes the metal oxide at a lower concentration than the weld region. The method also includes arranging the components such that a seam is defined between the components with weld regions positioned on opposing sides of the seams. The method further includes contacting at least one of the weld regions with a laser while using the laser to laser weld the components together along the seam. In some instances, the surface of the weld region includes a layer that is more than 2% oxygen atoms and the surface of the exposed region includes a layer that is less than 2% oxygen atoms.

In some instances, an electrically conducting battery part is in contact with an exposed region of one of the components at an interface while laser welding the components together along the seam. An electrical current is carried through the interface during operation of the battery. For instance, arranging the components can include contacting the battery part with the exposed region of the components such that an electrical current is carried through the interface during operation of the battery.

BRIEF DESCRIPTION OF THE FIGURES

FIG. 1A through FIG. 1E illustrate a method of welding a battery component.

FIG. 2A through FIG. 2I illustrate a method that employs a battery component constructed according to FIG. 1A through FIG. 1E in a battery.

DESCRIPTION

A layer of a metal oxide is removed from battery components so as to define a weld region and an exposed region on the components. A surface of the weld region includes the metal oxide and a surface of the exposed region includes the metal oxide at a lower concentration than the weld region. Generally, metal oxides reflect less light than the metal in the metal oxide. As a result, the presence of the metal oxide in the weld region permits the weld region to be laser welded. However, the metal oxides are generally less conductive than the metal in the metal oxide. As a result, the reduced concentration of the metal oxide in the exposed region provides the exposed region with a higher degree of electrical conductivity. As a result, the weld regions are employed to weld the components together such that electrical current is conducted through the exposed regions. As a result, the components can be efficiently welded while still providing efficient current conduction.

Figure 1A:
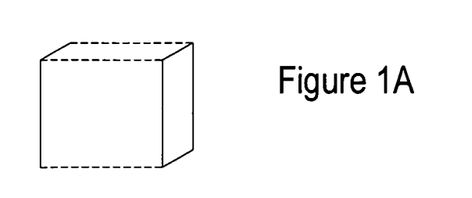
FIG. 1A is a perspective view of a battery component to be welded.

FIG. 1A through FIG. 1E illustrate a method of welding components of electrochemical devices. FIG. 1A illustrates a battery component that is to be welded during the construction of a battery. The component can be entirely metal or can include one or more metal surfaces that are exposed to the atmosphere and that are to be welded to other components or parts. The metal can include one or more metal elements. For instance, the metal can be an alloy. The component of FIG. 1A is illustrated as being entirely metal. Suitable metals for the component include, but are not limited to, copper, aluminum, silver, alloys that include copper, alloys that include aluminum, and alloys that include silver.

Many metals will form a metal oxide (oxide) layer when exposed to an atmosphere that contains substantial levels of oxygen. The oxide layer can reduce the electrical conductivity of the component. As a result, battery components that carry current are often stored such that an oxide film does not form on the battery component. For instance, the battery component may be stored in an inert atmosphere that excludes oxygen such as an $N_2$, He, Kr and/or Ar atmosphere or in mineral oil. In the event that the component is not stored such that an oxide film does not form on the battery component, the component may include a layer of oxide that result from the exposure of the component to the ambient atmosphere.

Figure 1B:
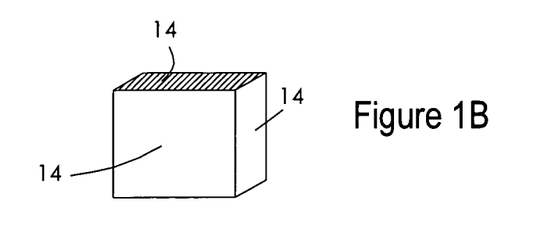
FIG. 1B illustrates an oxide layer formed on the battery component of FIG. 1A.

FIG. 1B illustrates a metal oxide (oxide) layer 14 formed on the battery component of FIG. 1A. The metal oxide is illustrated by the shaded region of the component. When the metal is copper, a layer of copper oxide is formed on the component. The oxide layer can be formed by thermal oxide growth. For instance, the battery component can be placed in an oven such that the battery component is exposed to oxygen or air for a period of time sufficient to form a desired concentration of oxide on the surface of the battery component. Examples of suitable conditions for forming a suitable oxide layer include, but are not limited to, temperatures above 60° C. for a time exceeding 8 hours, temperatures above 80° C. for a time exceeding 8 hours, or temperatures above 120° C. for a time exceeding 8 hours. The oxide layer can also be formed by exposing the battery component to the ambient atmosphere at room temperature for a period of time that is sufficient to form a desired concentration of oxide on the surface of the battery component. Examples of time periods that are suitable for forming an oxide layer to the desired concentration include, but are not limited to, time periods longer than 2 hours, 4 hours or 8 hours.

Figure 1C:
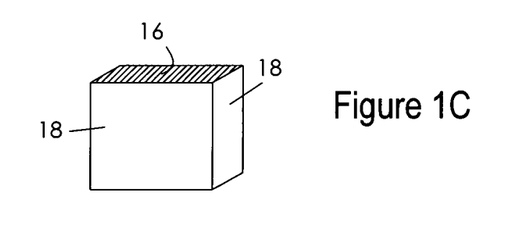
FIG. 1C illustrates the oxide layer of FIG. 1B removed from one or more regions of the battery component.

FIG. 1C illustrates the oxide removed from one or more regions of the battery component. Removing the oxide defines one or more weld regions 16 that include the oxide and one or more exposed regions 18 that include the oxide at a lower concentration than the weld regions 16 or that exclude the oxide. The weld regions 16 are suitable for welding because the oxide does not reflect light from the laser as a well as the exposed regions 18. Additionally, the exposed regions 18 are better suited for carrying electrical current than the weld regions 16 because the oxide has been removed from these regions. Suitable methods for removing the oxide include contact methods such as machining or non-contact methods such as laser ablation.

Figure 1D:
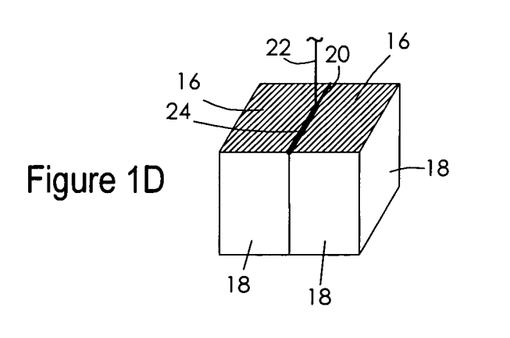
FIG. 1D illustrates laser welding of two battery components constructed according to FIG. 1A through FIG. 1C.

FIG. 1D illustrates laser welding of two battery components constructed according to FIG. 1A through FIG. 1C. The battery components are arranged so as to define a seam 20 between the battery components with weld regions 16 being positioned on opposing sides of the seam 20. The laser 22 is moved along the seam 20 so as to weld the components together at the seam 20. While forming the laser weld 24 at the seam 20, the laser can contact a weld region 16 on one side of the seam 20 or the weld regions 16 on both sides of the seam 20. In some instance, the laser 22 concurrently contacts the weld region 16 on both sides of the seam 20. The weld 24 that results can include the metal as well as the metal oxide.

When forming the weld, the portions of components that define the seam 20 can be contacting one another. Alternately, the portions of components that define the seam 20 can be spaced apart. When the portions of components that define the seam 20 are spaced apart there can optionally be additional components or parts between the portions of components that define the seam 20. For instance, as will be described in more detail below, electrode tabs can be positioned between the components so the portions of components that define the seam 20 are spaced apart. When the portions of components that define the seam 20 are spaced apart, a suitable distance for the gap between the components includes distances of less than 500 µm, 50 µm or 5 µm.

Figure 1E:
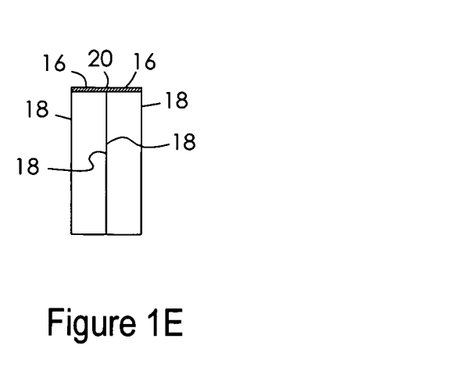
FIG. 1E is a cross-section of the battery components shown in FIG. 1D showing the interface of between two faces of the battery component.

In some instances, one or more electrically conducting battery parts are contacted with an exposed region 18 of a component while forming the laser weld. An electrically conducting battery part can be different from one of the components. For instance, a tab of an electrode can serve as an electrically conducting battery part as will be described in more detail below. Alternately, another one of the components can serve as the electrically conducting battery part. For instance, FIG. 1E is a cross-section of the battery components shown in FIG. 1D. Each component has a surface that contacts a surface on the other component at an interface. The two surfaces can contact one another while welding the seam 20 or as a result of welding the seam 20. At least a portion of each surface at the interface is an exposed region 18. Since the oxide is removed from the exposed regions 18, electrical current is efficiently carried through the interface between the battery components. As a result, the laser weld 24 of FIG. 1D and FIG. 1E is an efficient weld 24 while still permitting conduction of electrical current between the battery components.

The efficiency with which the battery components are welded increases as the amount of oxide in the weld region 16 increases. For instance, the weld region is preferably formed such that the surface includes a layer having an atomic content that is more than 2% oxygen. When the battery component is constructed to have a weld region 16 that includes copper oxide and an exposed region 18 that includes copper, Energy Dispersive X-ray analysis (EDX) has been employed to examine the percentage of the surface layer that is oxygen. For instance, the layer can include the oxygen in a copper oxide represented by $CuO_x$ where $0 \leq x \leq 0.02$. The percentage of oxygen atoms in the copper crystal lattice was measured. When the surface of the weld region 16 includes a layer having an atomic content that is less than 2% oxygen, a laser weld 24 is difficult to form. However, when the atomic content of the layer becomes more than 2% oxide, the laser weld 24 can be efficiently formed. As a result, the layer on the weld region can have an atomic content that is more than 2% oxygen, or more than 3.5% oxygen, or more than 5% oxygen while the surface of the exposed region 18 has a layer with an atomic content that is less than 2% oxygen, or less than 1% oxygen, or less than 0.5% oxygen. In one example, the surface of the weld region has a layer with an atomic content that is more than 5% oxygen while the surface of the exposed region has a layer with an atomic content that is less than 2% oxygen. In another example, the surface of the weld region has a layer with an atomic content that is more than 2% oxygen while the exposed regions 18 surfaces essentially exclude metal oxide.

Although the battery components shown in FIG. 1A through FIG. 1E are shown as having a block shape, the battery components can have other shapes. For instance, the battery component of FIG. 1C can be cut, machined, and/or drilled to form a battery component having a cut-out according to FIG. 2A. Alternately, the battery component of FIG. 1A can be formed into the shape of FIG. 2A before oxide is formed on the battery component and then removed so as to define a battery component having the weld regions 16 and exposed regions 18 evident in FIG. 2A. Alternately, the battery component of FIG. 1A can be formed into the shape of FIG. 2A and then the oxide can be removed so as to define a battery component having the weld regions 16 and exposed regions 18 evident in FIG. 2A.

Figure 2A:
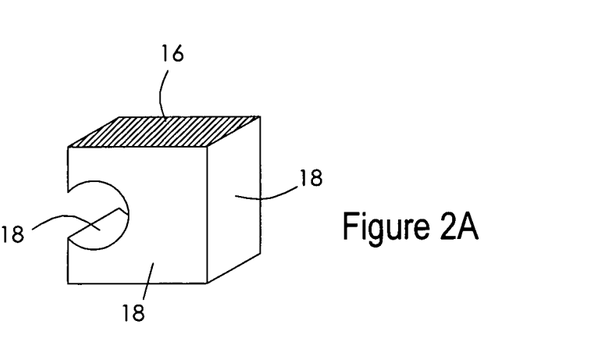
FIG. 2A is a perspective view of a battery component cut out of the battery component illustrated in FIG. 2E.
Figure 2B:
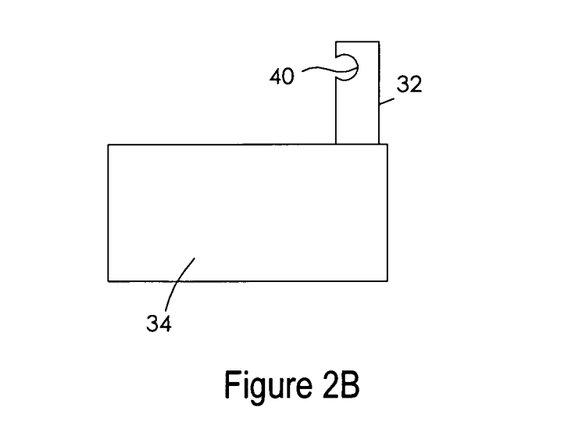
FIG. 2B is a sideview of an electrode that is suitable for use with the battery. The electrode includes a tab in electrical communication with an active medium.

The battery component of FIG. 2A can be employed as a washer and/or a spacer in a battery. FIG. 2B through FIG. 2I illustrate a method that employs the battery component of FIG. 2A in a battery. FIG. 2B is a sideview of an electrode that is suitable for use with the battery. The electrode includes a tab 32 in electrical communication with an active medium 34 that includes one or more active materials. The illustrated electrode can serve as an anode or a negative electrode, or the electrode can serve as a positive electrode or a cathode. The tab 32 includes a tab opening 40 that extends through the tab. The tab opening 40 is open to an edge of the tab 32 and expands outward from the gap at the edge of the tab. Accordingly results in C-shape although other shapes are possible. Alternatively, the tab opening 40 can be positioned on the tab 32 such that the tab 32 surrounds the opening. As will be discussed in more detail below, the tab openings 40 can be employed to align electrodes 12 during fabrication of an electrochemical cell.

Figure 2C:
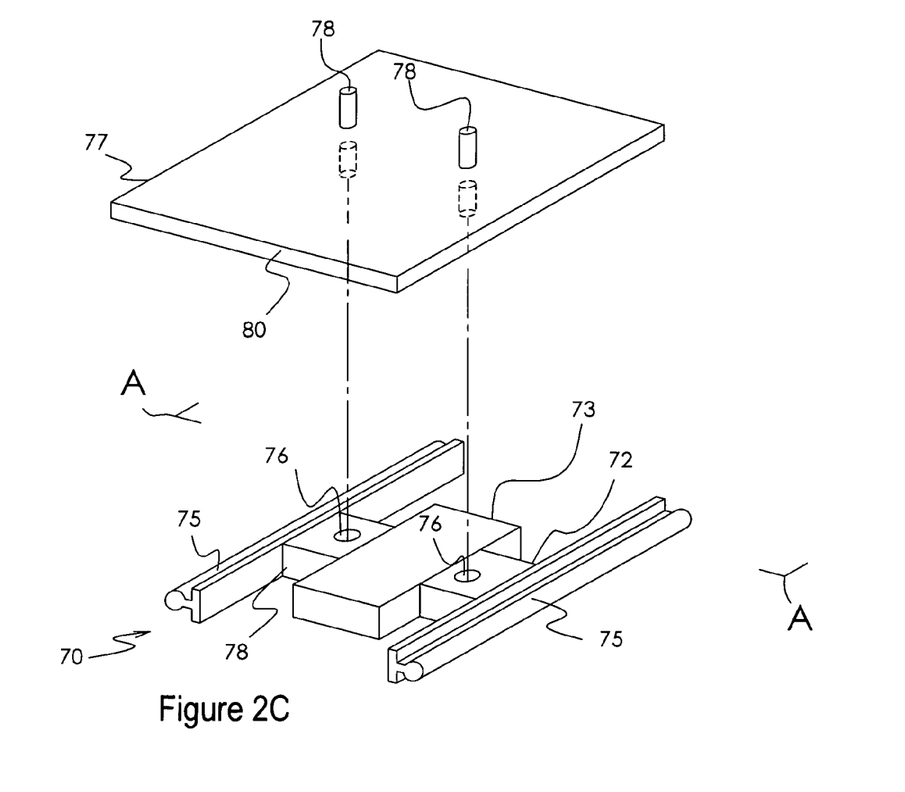
FIG. 2C is a perspective view of a suitable stacking system for stacking electrodes for use in a battery. The stacking system includes posts that are each configured to receive the tabs of electrodes constructed according to FIG. 2B.
Figure 2D:
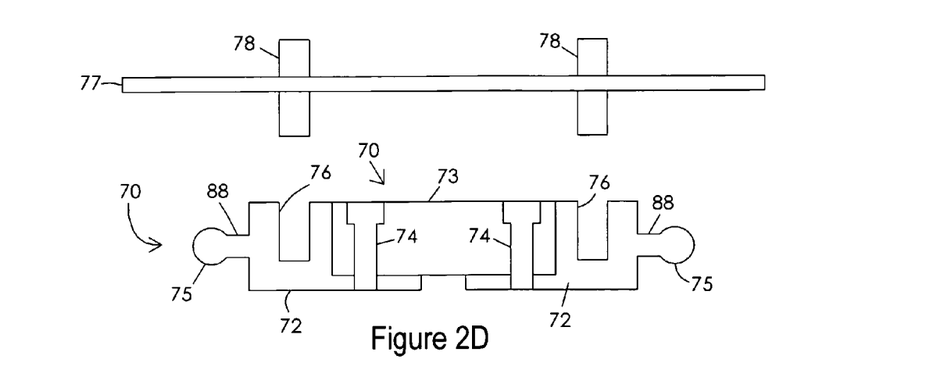
FIG. 2D is a cross section of the stacking system of FIG. 2C taken along a line extending between the brackets labeled A.

Electrodes according to FIG. 2B and battery components according to FIG. 2A can be employed in conjunction with a stacking system. FIG. 2C is a perspective view of a suitable stacking system and FIG. 2D is a cross section of the stacking system shown in FIG. 2C taken along a line extending between the brackets labeled A. The stacking system includes a stacking structure 70 for forming a stack having electrodes alternated with electrode systems. The stacking structure includes two electrode-receiving members 72 that are mechanically connected. An insulating member 73 couples the electrode-receiving members 72 such that the electrode-receiving members 72 are electrically isolated from one another. The insulating member can be injection molded. Suitable materials for constructing the insulating member include, but are not limited to, perfluoroalkoxy (PFA).

A variety of techniques can be employed to mechanically connect the electrode receiving members 72 to the insulating member 73. FIG. 2C illustrates holes 74 extending through the insulating member 73 into the electrode receiving members 72. Fastening devices can be inserted into the holes 74 so as to mechanically connect the insulating member 73 and the electrode receiving member 72. In some instances, the fastening devices are threaded screws that can be screwed into the holes 74 so as to immobilize the electrode receiving members 72 relative to the insulating member 73.

Each electrode-receiving member 72 includes a post 75 configured to serve as a current collector. Each electrode-receiving member 72 also includes a recess 76. The electrode-receiving member 72 is configured such that each of the posts 75 is in electrical communication with a material that defines the inside of the recess 76. Accordingly, the posts 75 are in electrical communication with a material inside the recess 76. In some instances, the electrode-receiving members 72 have a one-piece construction. When the electrode-receiving members 72 have a one-piece construction, a suitable material for the electrode-receiving members 72 includes, but is not limited to, Stainless Steel, Al, Ti, and Ni.

The stacking system also includes a cell cover 77 for use with the stacking structure 70. The cell cover 77 includes two feedthrough pins 78 extending through a cover 80. The feedthrough pins and/or the cover 80 are configured such that the feedthrough pins 78 are electrically isolated from one another and/or from the cover. Suitable materials for the cover 80 include, but are not limited to, Stainless Steel, Al and Ti. The portion of the pins 78 that is exposed on the top of the 80 cover serves as the terminals for the electrochemical cell and the portion of the pins 78 exposed on the bottom of the cover fit into the recesses 76 on the stacking structure 70. Because a material in the recesses 76 is in electrical communication with the posts 75, positioning the cell cover 77 on the stacking structure 70 provides electrical communication between the feed through pins 78 and the posts 75.

Figure 2E:
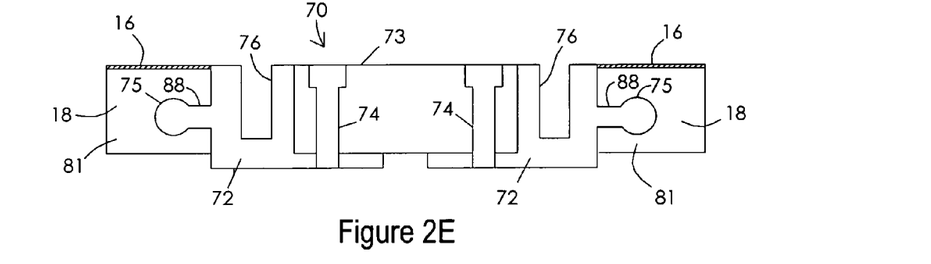
FIG. 2E is a cross section of a stacking structure of FIG. 2C with the tab of an electrode slid along each of the posts.
Figure 2F:
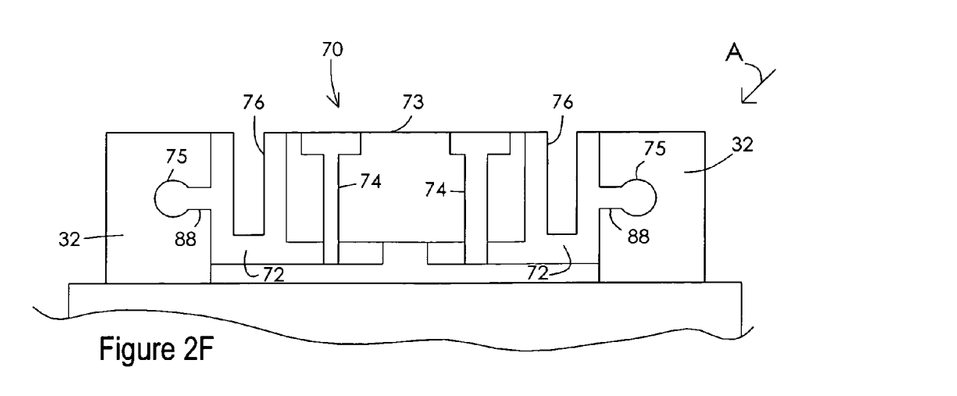
FIG. 2F is a cross section of a stacking structure of FIG. 2C with a washer slid along each of the posts. The battery component of FIG. 2A can serve as the washer.

The posts 75 are sized such that the tab opening of an electrode 12 can be positioned over the post 75 and slid along the post 75. For instance, FIG. 2E is a cross section of a stacking structure 70 with the tab 32 of an electrode slid along each of the posts 75. In some instances, washers (or spacers) 81 can also be positioned over the post 75 and slid along the post 75. For instance, FIG. 2F is a cross section of a stacking structure with a washer 81 slid along each of the posts 75. The battery component of FIG. 2A can serve as a washer 81. Accordingly, the top of the washer can include an oxide layer that serves as a weld region 16.

In some instances, a stem 88 connects the post 75 to the interface side 82 of the electrode receiving member 72. As evident in FIG. 2F, the tab opening 40 can have a shape that is complementary to the shape of the stem 88 and the post 75. As a result, the stem 88 can prevent rotation of the electrode around the post 75 and can aid in the alignment of the electrodes positioned on the post 75.

Figure 2G:
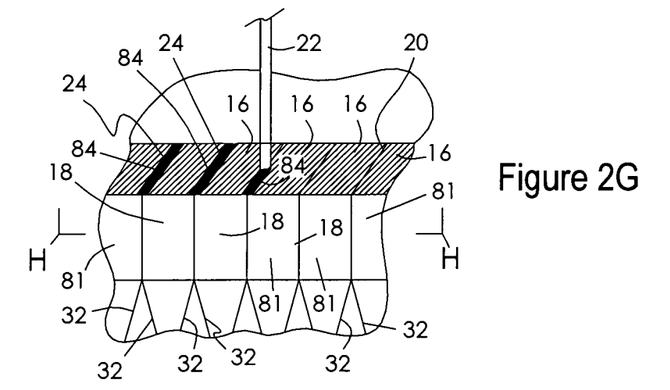
FIG. 2G is a sideview of a portion of the stacking structure shown in FIG. 2E taken looking in the direction of the arrow labeled F.
Figure 2H:
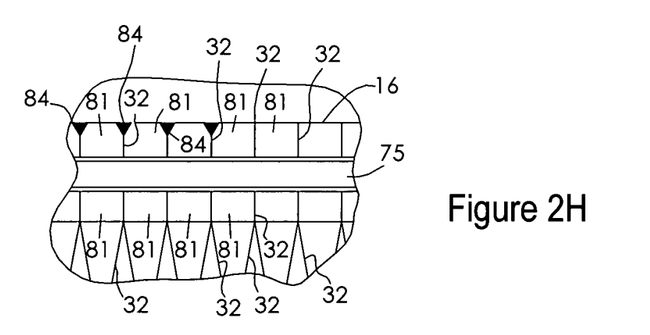
FIG. 2H is a cross-section of the stacking structure shown in FIG. 2G taken along a line extending between the brackets labeled H in FIG. 2G.

The electrodes can be positioned on the posts such that anodes alternate with electrodes. In some instances, one or more of the electrodes is positioned in a separator bag so a separator(s) separates each anode from the adjacent cathode(s). Additionally, the washers can be positioned on the posts such that the tab(s) of one or more electrodes are positioned between washers. For instance, FIG. 2G is a sideview of a portion of the stacking structure 70 shown in FIG. 2E taken looking in the direction of the arrow labeled F. FIG. 2H is a cross-section of the stacking structure shown in FIG. 2G taken along a line extending between the brackets labeled H in FIG. 2G. The tabs 32 and washers 81 are slid along a post 75 such that two tabs 32 are positioned between adjacent washers 81. The tops of the washers 81 include weld regions 16. As a result, a laser 22 can be employed to form laser welds on the tops of the washers 81. Additionally, at least a portion of the interface between adjacent washers 81 includes exposed regions 18 so electrical conductivity is retained between the washers 81.

Since tabs 32 are positioned between the washers before the laser weld 24 is formed, the tabs 32 are electrically conducting battery parts that contact an exposed region 18 of the washers while the weld 24 is formed or that contact the exposed region 18 of the washer 81 as a result of the weld 24 being formed. As a result, an electrical current can be conducted through the interface between the tab 32 and the exposed region 18 of the washer. When there is only on tab between washers, the tab can include two surfaces that each contact an exposed region 18 of a different washers while the weld 24 is formed or that contact the exposed region 18 of the different washers as a result of the weld 24 being formed. When there is more than two tabs between washers, a portion of the tabs may not contact an exposed region 18 of a washers while the weld 24 is formed or as a result of the weld 24 being formed.

In some instances, the relative sizes of the washers 81 and tabs 32 can permit adjacent washers contact one another despite the presence of the tabs 32 between the washers 81. For instance, tabs are often constructed of thin metal foil. As a result, when the side of the washer 81 that contacts a tab 32 extends beyond the perimeter of the tab, the portion of the washer extending beyond the tab 32 can come into contact with another washer on a post. As a result, both a tab and another washer can contact an exposed region 18 on a washer during the formation of a weld 24 or as a result of the formation of a weld. In contrast, when the side of the washer that contacts a tab does not extend beyond the perimeter of the tab, that side of the washer is not available to contact another washer.

Figure 2I:
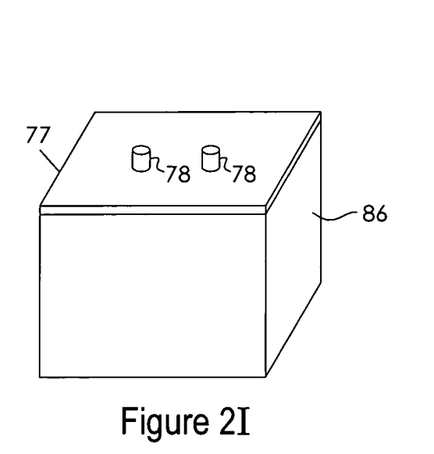
FIG. 2I illustrates a cover shown in FIG. 2C attached to a battery case.

After the stack has been created, the cell cover 77 is positioned on the stacking structure 70 with the feedthrough pins 78 extending into the recesses 76 on the stacking structure 70 as discussed with respect to FIG. 2C. The electrode stack is lowered into a case and the cell cover 77 sealed on the case. For instance, FIG. 2I illustrates the cover of FIG. 2C attached to a battery case 86. The stack can rest one or more structures at the bottom of the cell case. The electrolyte can be injected into the case through an opening in the cell cover 77.

Additional details about the construction of a battery using washers and electrodes is disclosed in U.S. patent application Ser. No. 10/697,537, filed on Oct. 29, 2003, entitled "Separator Bag for Use in Electrochemical Cell," and incorporated herein in its entirety.

Example 1

A washer was made from a pristine copper material. Energy Dispersive X-ray Analysis was employed to analyze the surface of the washer. The washer was found to have a surface with an atomic content that was about 0.5% oxygen atoms. An Nd:YAG laser was employed to weld the washer to another washer. The weld was unsuccessful.

Example 2

A washer was made from a copper material that was exposed to air at about 80° C. for about 4 hours. Energy Dispersive X-ray Analysis was employed to analyze the surface of the washer. The washer was found to have a surface with an atomic content that was about 2.5% oxygen atoms. An Nd:YAG laser was successfully employed to weld the washer to another washer.

Example 3

A washer was made from a copper material that was exposed to air at about 80° C. for about 4 hours. Energy Dispersive X-ray Analysis was employed to analyze the surface of the washer. The washer was found to have a surface with an atomic content that was about 5% oxygen atoms. An Nd:YAG laser was successfully employed to weld the washer to another washer.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A method of forming a battery, comprising:
    removing a metal oxide from battery components so as to define a weld region and an exposed region on the components,
        the weld regions including the metal oxide, and
        a concentration of the metal oxide on the exposed region of each component is at a lower concentration than a concentration of the metal oxide on the weld region of each component;
    arranging the components such that a seam is defined between the components with weld regions positioned on opposing sides of the seam; and
    contacting at least one of the weld regions with a laser while using the laser to laser weld the components together along the seam.

2. The method of claim 1, further comprising:
    forming the metal oxide on the battery components before removing the metal oxide.

3. The method of claim 2, further comprising:
    storing the battery components in an environment that excludes oxygen before forming the metal oxide on the battery components.

4. The method of claim 1, where arranging the components includes sliding the components onto a post.

5. The method of claim 4, wherein the components are slid onto a post with one or more electrode tabs positioned between the components.

6. The method of claim 4, wherein arranging the components includes contacting an electrically conducting battery part with an exposed region of one of the components at an interface such that an electrical current is carried through the interface during operation of the battery.

7. The method of claim 1, wherein a surface of the weld regions each includes a layer having an atomic content that is more than 2% oxygen atoms and a surface of the exposed regions each includes a layer having an atomic content that is less than 2% oxygen atoms.

8. The method of claim 1, wherein a surface of the weld regions each includes a layer having an atomic content that is more than 5% oxygen atoms and a surface of the exposed regions each includes a layer having an atomic content that is less than 2% oxygen atoms.

9. The method of claim 1, wherein a surface of the weld regions each includes a layer having an atomic content that is more than 2% oxygen atoms and a surface of the exposed regions each includes a layer that substantially excludes the metal oxide.

10. The method of claim 1, wherein an electrically conducting battery part is in contact with an exposed region of one of the components at an interface while laser welding the components together along the seam,
    an electrical current being carried through the interface during operation of the battery.

11. The method of claim 1, wherein the metal of the metal oxide is copper.

12. The method of claim 1, wherein the weld regions on each side of the seam are contacted with the laser while laser welding the components together along the seam.

13. The method of claim 1, wherein arranging the components includes contacting an electrically conducting battery part with an exposed region of one of the components at an interface such that an electrical current is carried through the interface during operation of the battery,
    the electrically conducting battery part remaining in contact with the exposed region while using the laser to laser weld the components together along the seam.

14. The method of claim 1, wherein the removal of the metal oxide causes the concentration of the metal oxide on the exposed region of each component to be lower than the concentration of the metal oxide on the weld region of each component.

15. A method of forming a battery, comprising:
    removing metal oxide from battery components so as to define a weld region and an exposed region on the components,
        a surface of the weld regions each includes a layer having an atomic content that is more than 2% oxygen atoms, and
        a surface of the exposed regions each includes a layer having an atomic content that is less than 2% oxygen atoms;
    positioning the components on a post with electrode tabs positioned between the components and such that a seam is defined between the components with weld regions positioned on opposing sides of the seams; and contacting at least one of the weld regions with a laser while laser welding the components together along the seam.

16. The method of claim 13, wherein one of the components serves as the electrically conducting battery part.

17. The method of claim 13, where a tab of an electrode serves as the electrically conducting battery part.

18. The method of claim 13, wherein the components are spacers positioned along a post that is in electrical communication with a battery terminal.

19. The method of claim 18, wherein a plurality of one or more electrode tabs are positioned between the spacers.

20. The method of claim 13, further comprising:
positioning the components in an interior of a battery case.

* * * * *